United States Patent
Sato

[11] Patent Number: 6,069,660
[45] Date of Patent: May 30, 2000

[54] AUTOMATIC BLACK LEVEL STABILIZING APPARATUS

[75] Inventor: Hiroaki Sato, Kawanishi, Japan

[73] Assignee: Matsushita Electric Industrial Co., Ltd., Kadoma, Japan

[21] Appl. No.: 08/968,784

[22] Filed: Nov. 12, 1997

[30] Foreign Application Priority Data

Nov. 12, 1996  [JP]  Japan ................... 8-300023

[51] Int. Cl.[7] .............. H04N 5/68; H04N 5/14; G09G 1/04
[52] U.S. Cl. .............. 348/379; 348/379; 348/673; 348/687; 348/688; 315/383; 315/386; 315/380; 315/384
[58] Field of Search .............. 348/379, 377, 348/378, 380, 673, 687, 688, 689, 691–98; 315/383, 386, 1, 380, 381, 384; 358/29

[56] References Cited

U.S. PATENT DOCUMENTS

| | | | |
|---|---|---|---|
| 4,730,210 | 3/1988 | Leshko | 358/34 |
| 4,930,004 | 5/1990 | Yamamoto et al. | 358/29 |
| 5,321,504 | 6/1994 | Mazet | 348/379 |
| 5,339,114 | 8/1994 | Lagoni et al. | 348/673 |
| 5,416,533 | 5/1995 | Kageyama | 348/673 |
| 5,504,538 | 4/1996 | Tsujihara et al. | 348/673 |
| 5,714,842 | 2/1998 | Krause et al. | 315/1 |
| 5,889,558 | 3/1999 | Ikeda | 348/380 |
| 5,892,337 | 4/1999 | Van Den Broeke | 315/383 |
| 5,894,327 | 4/1999 | Griepentrog | 348/379 |

FOREIGN PATENT DOCUMENTS 61-245688  10/1986  Japan .

Primary Examiner—John K. Peng
Assistant Examiner—Paulos Natnael
Attorney, Agent, or Firm—Ratner & Prestia

[57] ABSTRACT

An apparatus for automatically stabilizing the black level of a displayed picture when (1) an automatic black level stabilizing function is OFF, (2) black level error occurs between at an ON state and at an OFF state and (3) black level variation and picture disturbance occurs during activation and deactivation of the automatic black level stabilizer. Black level variations when the automatic black level stabilizer are OFF is controlled by processing a cathode current in a negative feedback loop and controlling a CRT grid voltage, storing a divided grid voltage during a converging period and processing the grid voltage in another negative feedback loop in order to adjust the grid voltage to an ON state value.

17 Claims, 13 Drawing Sheets t1...Switcher 10 Is Switched t2...Switcher 10 Is Switched Upward (7 Side)
t3...Switcher 21 Is Switched Downward(10 Side)

t4...Switcher 28 Is Switched Downward (26 Side)
t5...Switcher 28 Is Switched Upward (25 Side)

AUTOMATIC BLACK LEVEL STABILIZING APPARATUS

BACKGROUND OF THE INVENTION

1. Field of the Invention

The present invention relates to a signal processing circuit for a cathode ray tube (CRT) display to process so that the black level of a displayed picture becomes constant. (International Patent Classification H04N 9/73).

2. Description of the Prior Art

In a display using a CRT, a circuit which is usually used to keep the black level of a displayed picture constant is called an automatic cut-off circuit. This circuit adds a detecting pulse on a vertical blanking period of a video signal. A cathode current during the vertical blanking period is detected and is processed to be kept at a constant level.

Because a pulse is added on the vertical blanking period and a detecting current flows in the CRT's cathode, when the vertical sync signal is temporarily lost, for example during video signal switching, the picture appears to be disturbed in that the pulse added period is displayed for a moment. This is a problem. In the case of a front projection display, the detecting pulse cannot be processed to prevent display on the screen and the pulse is typically displayed at the top or bottom part of the displayed picture. This is also a problem. To address the above problems, Japanese Patent Laid-Open 6-95766 discloses a circuit to process the detecting pulse not to be displayed on the screen by disabling the automatic black level stabilizing process.

A block diagram of a principal part of a circuit described in Japanese Patent Laid-Open 6-95766 is shown in FIG. 7. The circuit includes a CRT 1, a video amplifier 2, a detecting pulse adding circuit 3, a current detecting circuit 30, a DC level control circuit 54 and a control CPU 58 to control each of the above circuits. The automatic black level stabilizing function is realized by negative feedback processing that adds a detecting pulse to a video signal at detecting pulse adding circuit 3, a current detected at the cathode is converted into a voltage signal, which is A/D converted. The converted signal is sent to an interface circuit 57 and DC level control circuit 54 is controlled by control CPU 58 so that the detecting current is constant. When a video signal is switched, for example by a channel selection, display of the detecting pulse is prevented by stopping the output of the added pulse by control CPU 58. Because the same control signal as that of the negative feedback processing case is sent to DC level control circuit 54 at this time, the black level of the displayed picture is maintained.

In Japanese Patent Laid-Open 6-95766, negative feedback is processed by software and another circuit, shown in FIG. 8, is used for high speed processing. The circuit includes a CRT 1, a video amplifier 2, a detecting pulse adding circuit 3, a current detecting circuit 30, a comparison circuit 7, a switcher 10, and a data control CPU 31. In the system shown in FIG. 8, negative feedback processing is done by hardware in real time. The detecting current level is kept constant, the black level is stabilized and is detected at a sample hold circuit 5. The detected signal is compared with a reference voltage at comparison circuit 7 and is used for a grid voltage of CRT 1. Thus, the detecting current is controlled so as to be kept constant. The output of comparison circuit 7 is supplied to data control CPU 31 after being converted from an analog signal into a digital signal at an A/D converter 15 and, a voltage signal equal to the output of comparison circuit 7 is output from a D/A converter 17 and supplied to a switcher 10. To stop the automatic cut-off function, switcher 10 is switched, the grid voltage is controlled by the output of D/A converter 17 and the black level of the displayed picture is kept constant.

The circuits described above have the following problems.

(1) When the automatic black level stabilizing function is disabled (off), the black level varies over time due to factors such as environmental temperature variation and heat dissipation of the circuit elements because negative feedback processing is not done.

(2) When the automatic black level stabilizing function is switched from an on-state (working) to an off-state (non-working), an error occurs in the black level due to errors at the A/D converter and the D/A converter (for example, errors in the power source voltage or unevenness of circuit constants).

(3) When the automatic black level stabilizing function is switched from an off-state to an on-state, an undesirable picture results due to the appearance of an unstable black level until the negative feedback loop converges.

SUMMARY OF THE INVENTION

The present invention relates to an automatic black level stabilizing apparatus. A first exemplary embodiment of the present invention includes the following features.

Adding means for adding a detecting pulse during a blanking period of a video signal.

Detecting means for detecting a black level of display means displaying the video signal.

First control means for controlling a brightness of the display means by comparing the black level of display means displaying the video signal with a reference voltage.

Second detecting means for detecting a grid voltage level of the display means.

Memory means for storing the output level of the detecting means when the first control means is working.

Second control means for controlling the brightness of the display means by comparing the output level of the second detecting means stored in the memory means with the output level of the second detecting means when the first control means is not working.

A second exemplary embodiment of the present invention relates to a method for performing so that stored digital data is equal to an original divided grid voltage when it is D/A converted. The steps that are performed include D/A converting a digital data, A/D converting the converted analog data, storing the A/D converted data, obtaining a conversion function of the A/D converted data against the digital data before D/A conversion, converting the data using the conversion function obtaining the A/D converted data of the divided grid voltage and D/A converting the converted data.

To address problem (3), two methods are disclosed. A grid voltage may be switched to a larger fixed voltage than that when a stabilizing circuit is working and then switched to the other stabilizing circuit when switching is made between functions of a cathode current stabilizing circuit and a grid voltage stabilizing circuit.

Alternatively, a comparison voltage of a comparison circuit of a stabilizing circuit is switched to a lower voltage than a stable state and then put back the comparison voltage to the original value after switching to another stabilizing circuit and stabilize the grid voltage, when switching is made between functions of a cathode current stabilizing circuit and a grid voltage stabilizing circuit.

A third exemplary embodiment of the present invention relates to a method of switching a first black level stabilizing circuit and a second black level stabilizing circuit by switching comparison input signals to a comparison circuit.

In the first black level stabilizing circuit, a detecting pulse is added on a blanking period of a video signal, a cathode current of the detected pulse period is detected, the detected output is compared with a reference voltage, a black level of a displayed picture is stabilized by controlling a negative feedback loop so that the cathode current is kept constant by adjusting a grid voltage according to the compared result.

In the second black level stabilizing circuit, the grid voltage when the first stabilizing circuit is working is divided, the divided analog voltage is A/D converted into a digital data, the digital data is stored, the stored digital data is converted into an analog data so as to be equal to the divided grid voltage before A/D conversion, the converted data is compared with the divided grid voltage, a black level of a displayed picture is stabilized by controlling a negative feedback loop so that the grid voltage converges to the converted analog voltage.

BRIEF DESCRIPTION OF THE DRAWINGS

FIG. 10(a) is a graph showing an output voltage variation of comparison circuits 7 and 8 by time.

FIG. 10(b) is a graph showing a grid voltage variation by time when switcher 10 and 21 are switched.

FIG. 10(c) is a graph showing a grid voltage variation by time when switcher 28 is switched.

FIG. 12(a) is a timing of a vertical sync signal.

FIG. 12(b) is a timing of an input video signal of detecting the pulse adding circuit 3.

FIG. 12(c) is a timing of a detecting pulse and a sample hold pulse (output of sync timing circuit 4).

FIG. 12(d) is a timing of an output signal of video amplifier 2.

FIG. 12(e) is a timing of an Ik detecting voltage (output of current detecting circuit 30).

FIG. 12(f) is a timing of an output voltage of sample hold circuit 5.

DETAILED DESCRIPTION OF THE INVENTION

First Exemplary Embodiment

Figure 1:
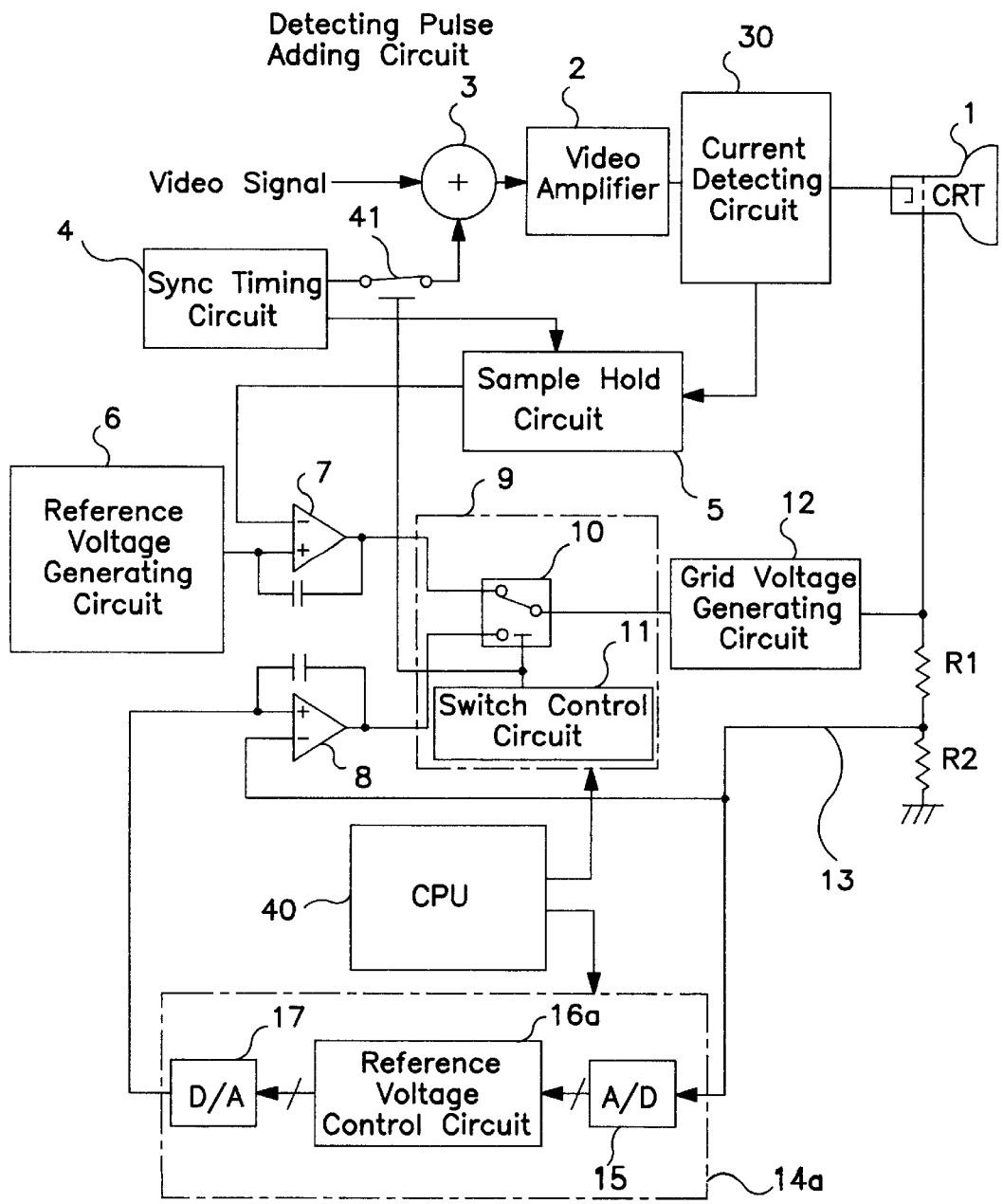
FIG. 1 is a block diagram of an automatic black level stabilizing apparatus in accordance with a first exemplary embodiment of the present invention.

An automatic black level stabilizing apparatus in accordance with a first exemplary embodiment of the present invention is explained below, referring to FIGS. 1, 12 and 13. The apparatus includes a CRT 1, a video amplifier 2, a detecting pulse adding circuit 3, a sync timing circuit 4, a sample hold circuit 5, a reference voltage generating circuit 6, a current detecting circuit 30, comparison circuits 7 and 8, an automatic black level stabilization ON/OFF switching circuit 9, a grid voltage generating circuit 12, an automatic black level stabilization data control circuit 14a, a reference voltage control circuit 16a, control CPU 40 and a switcher 41.

First control means works like the following:

Detecting pulse adding circuit 3 works as adding means. That is, a video signal shown in FIG. 12(b) and a detecting pulse shown in FIG. 12(c) from sync timing circuit 4 are supplied to detecting pulse adding circuit 3 and a video signal shown in FIG. 12(d) having a detecting pulse during the blanking period of the video signal is output from detecting pulse adding circuit 3.

Figure 12A:
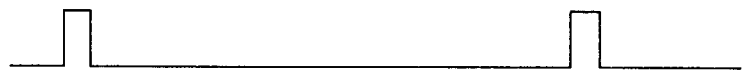
FIG. 12(a)–(f) is a timing chart of the essential signals in an automatic black level stabilizing apparatus in accordance with the first exemplary embodiment of the present invention.
Figure 12B:
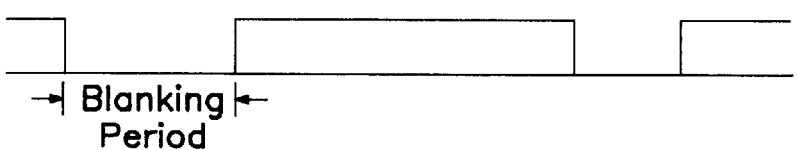
Figure 12C:
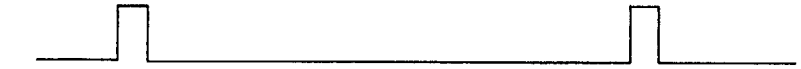
Figure 12D:
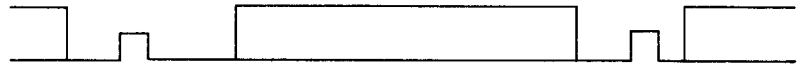
Figure 12E:
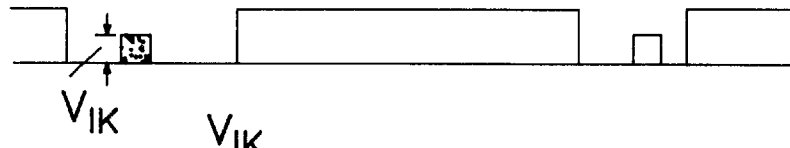
Figure 12F:
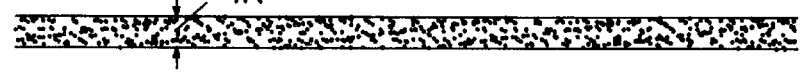

Current detecting circuit 30 works as first detecting means. That is, a video signal having a detecting pulse shown in FIG. 12(d) is applied to CRT 1 through video amplifier 2 and current detecting circuit 30. A cathode current flows in CRT 1, the cathode current Ik is detected at current detecting circuit 30, and an Ik detecting voltage VIk shown in FIG. 12(e) is output from current detecting circuit 30.

A combination of comparison circuit 7 and grid voltage generating circuit 12 functions as first control means. That is, the output voltage from current detecting circuit 30 and a pulse having the same timing as the detecting pulse from sync timing circuit 4 are supplied to sample hold circuit 5. The output voltage VIk during the detecting pulse period shown in FIG. 12(e) is sampled and held at sample hold circuit 5. A sample hold voltage shown in FIG. 12(f), which is a DC voltage having an amplitude of VIk, is supplied to comparison circuit 7.

A reference voltage is supplied to the other input of comparison circuit 7 from reference voltage generating circuit 6 and a difference voltage between the two inputs of comparison circuit 7 is output and supplied to grid voltage generating circuit 12.

Grid voltage generating circuit 12 outputs a grid voltage for CRT 1 according to the output of comparison circuit 7 and controls the grid of CRT 1 to stabilize the black level of the picture.

A second control means works as follows. For example, processing when the television receiver, including an automatic black level stabilizing apparatus, is turned on to when the second control means is activated is explained below.

Figure 13:
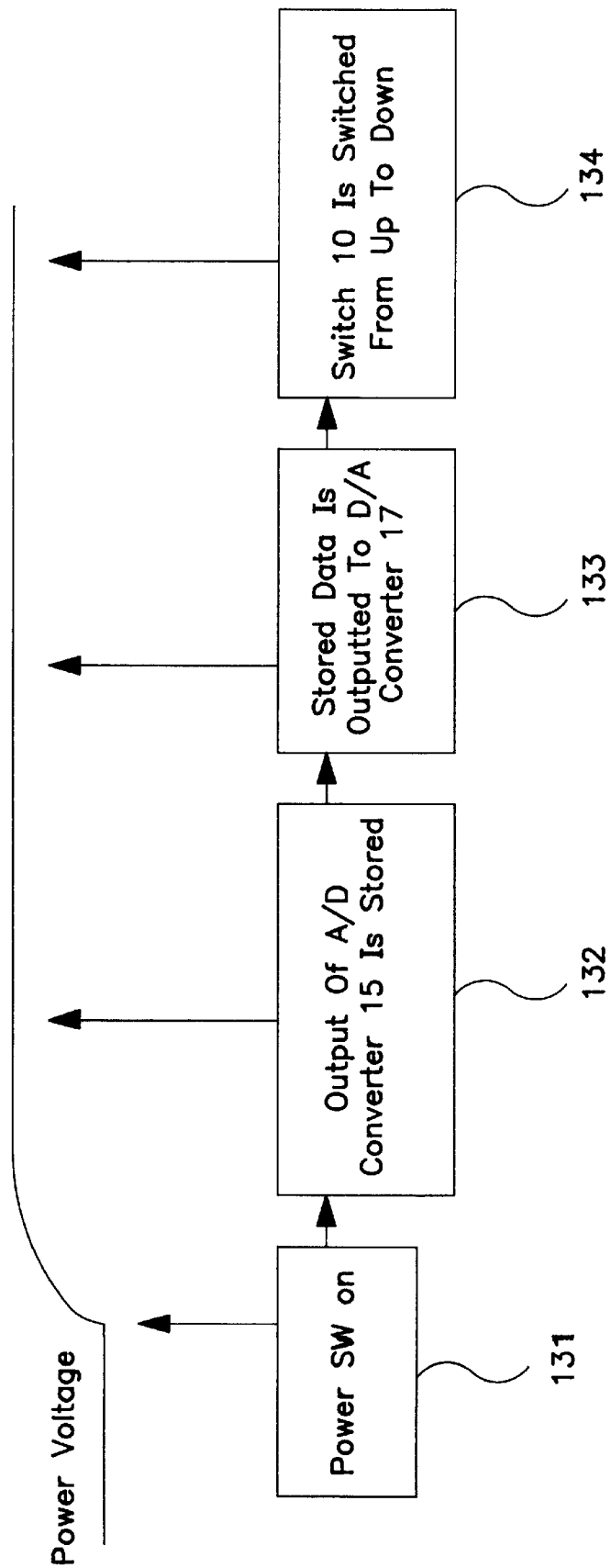
FIG. 13 is a switching timing of switcher 10 in an automatic black level stabilizing apparatus in accordance with the first exemplary embodiment of the present invention.

FIG. 13 shows a variation of the receiver power source voltage over time from power on to stabilization as well as a step that switcher 10 is switched from the upper position to the lower position. It is assumed that the working of the first control means also stabilizes before the power supply voltage fully stabilizes as well.

The power supply is turned on, as a first step 131. After the first control means stabilizes, a divided grid voltage supplied from a junction point of resistors R1 and R2 is stored at reference voltage control circuit 16a through A/D converter 15, as a second step 132. Resistors R1 and R2 work as second detecting means and reference voltage control circuit 16a works as memory means. The stored divided grid voltage is input to comparison circuit 8 through D/A converter 17, as a third step 133. A divided grid voltage from the junction point of resistors R1 and R2 is constantly supplied to the other input of comparison circuit 8 according to the present input video signal and a difference voltage is output. Switcher 10 is switched from the upper position to the lower position, as a fourth step 134. Grid voltage generating circuit 12 outputs a grid voltage for CRT 1 according to the output voltage of comparison circuit 8 and controls the grid voltage of CRT 1 to stabilize the black level of the picture.

A combination of comparison circuit 8 and grid voltage generating circuit 12 functions as second control means.

Switching functions are controlled by control CPU 40 through automatic black level stabilization ON/OFF switching circuit 9. Reference voltage control circuit 16a and switcher 41 are controlled so as not to supply the detecting pulse to detecting pulse adding circuit 3 when the switching is completed.

FIG. 1 is an exemplary block diagram for displaying only one color and it is understood that three circuits for three colors such as R, G and B may be provided for a color display.

The ON performance of an automatic black level stabilization function is explained, referring to FIG. 1. Switcher 10 is set to the upper position and is connected to the output of comparison circuit 7. A video signal is added with a detecting pulse on a vertical blanking period at detecting pulse adding circuit 3, amplified at video amplifier 2, applied to a cathode of CRT 1 and displayed on CRT 1 as a picture. The cathode current is detected at a current detecting circuit 30.

Figure 6:
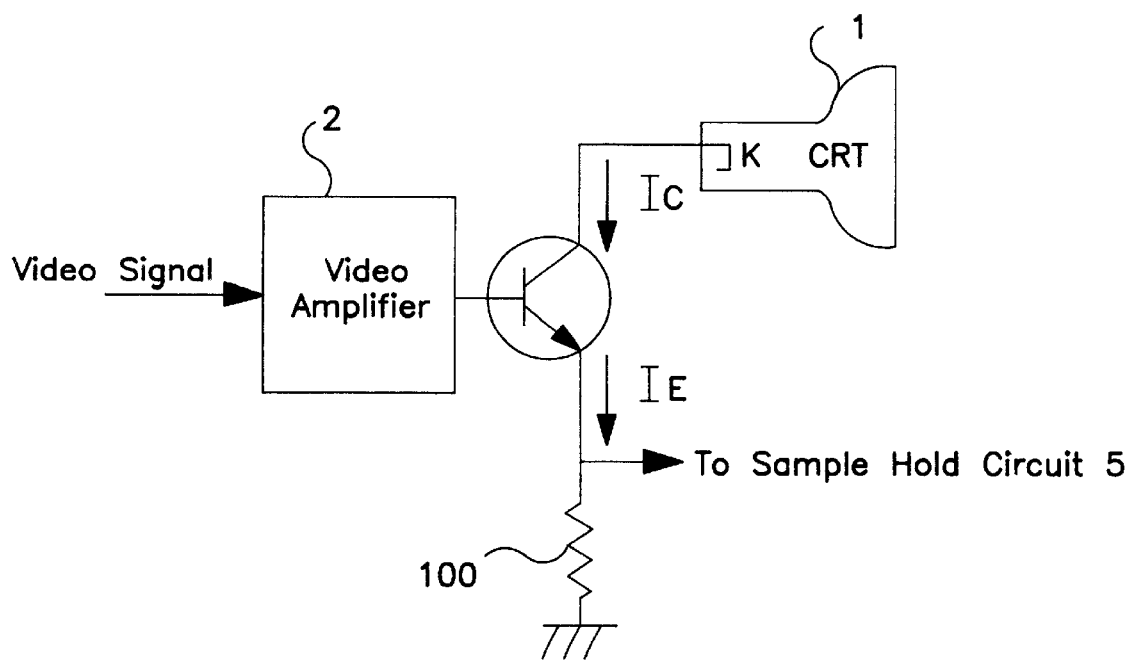
FIG. 6 is a block diagram of a current detector.
Figure 7:
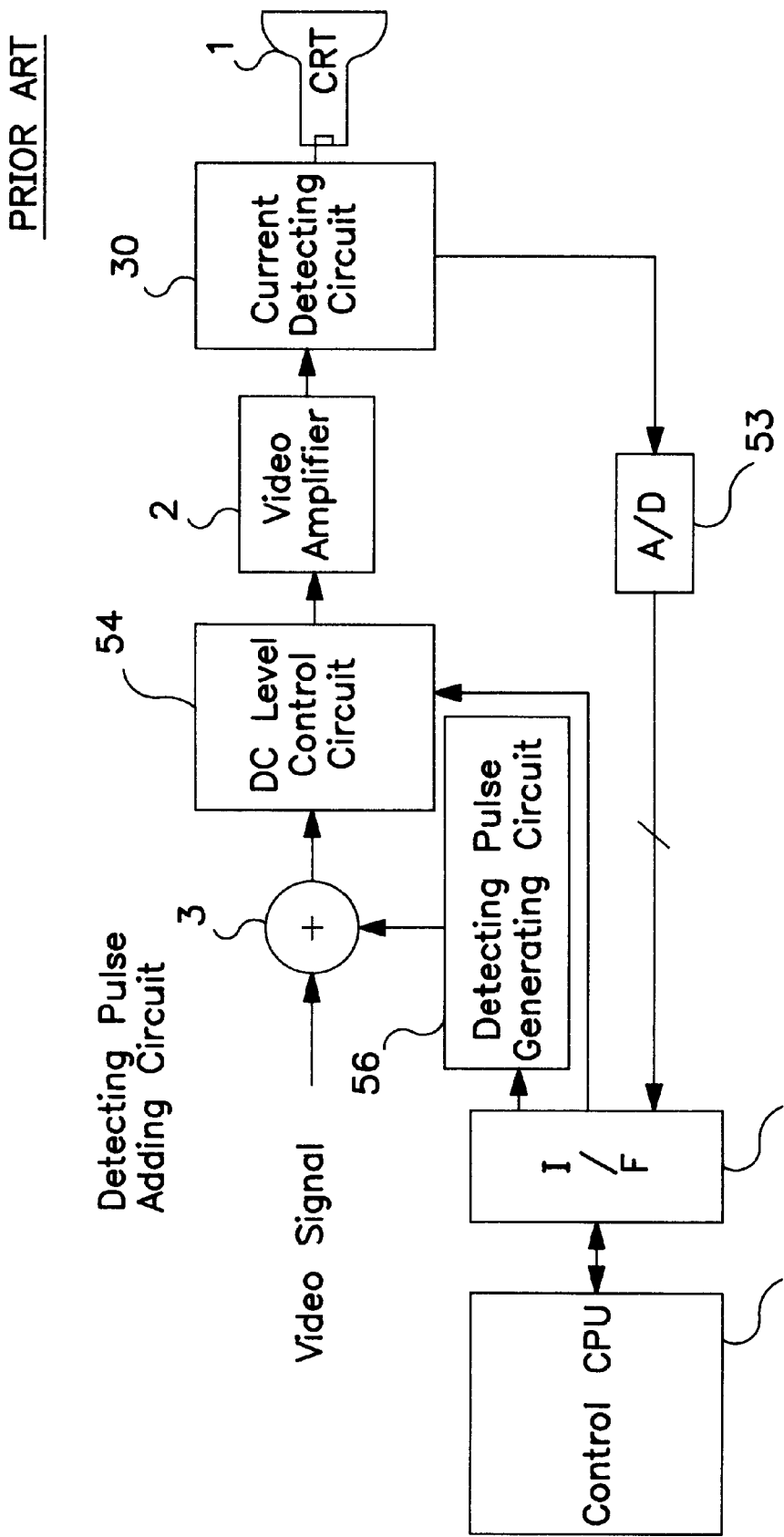
FIG. 7 is a block diagram of an automatic black level stabilizing apparatus in accordance with the prior art.
Figure 8:
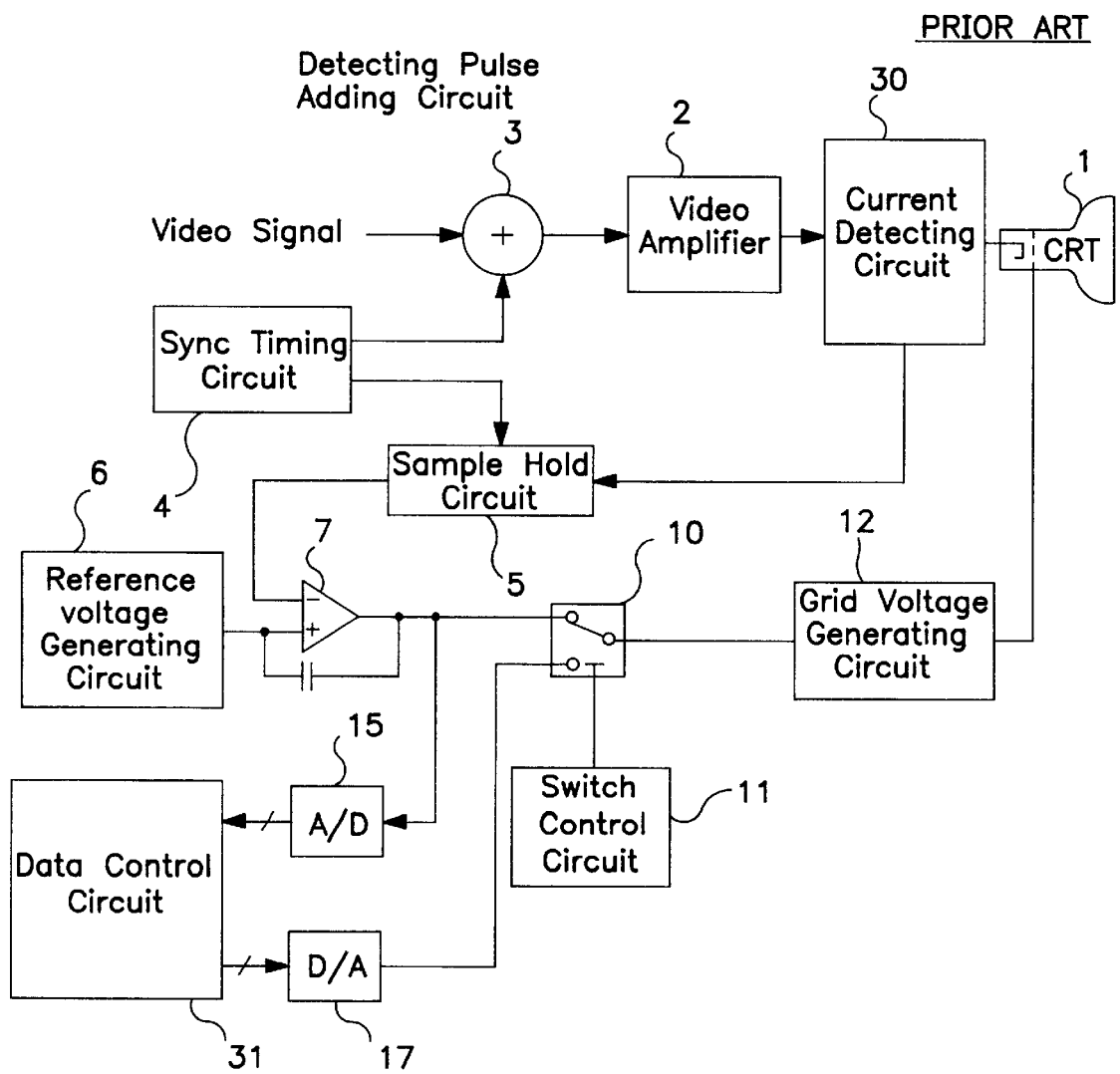
FIG. 8 is a block diagram of an automatic black level stabilizing apparatus in accordance with the prior art using high speed processing.

The current detecting circuit 30 can be made by a circuit composed of a transistor, for example, as shown in FIG. 6. A cathode current Ic flows from the collector to the emitter, is converted into a voltage at an emitter resistor 100 and is detected. Returning again to FIG. 1, the detected cathode current is sampled and held by a sample hold pulse having the same timing as the detecting pulse of detecting pulse adding circuit 3 at sample hold circuit 5 and is supplied to comparison circuit 7. To execute the above processing, sync timing circuit 4 generates the timing of detecting pulse adding circuit 3 and sample hold circuit 5 by processing vertical and horizontal sync signals.

A reference voltage from reference voltage generating circuit 6 is supplied to comparison circuit 7. When the sample hold voltage is lower than the reference voltage, the output voltage of comparison circuit 7 becomes positive and the positive voltage is supplied to grid voltage generating circuit 12 through switcher 10 and the first grid voltage G1 increases. When the sample hold voltage is higher than the reference voltage at comparison circuit 7, the output voltage of comparison circuit 7 becomes negative and the negative voltage is supplied to grid voltage generating circuit 12 through switcher 10 and the grid voltage is reduced. Thus, finally the negative feedback loop converges so that the sample hold voltage becomes equal to the reference voltage and the black level of the displayed picture is kept constant.

Next, the OFF performance of the automatic black level stabilization function is explained below. When the black level stabilization performance is ON, the grid voltage is divided by resistors R1 and R2 and the divided voltage 13 is supplied to an automatic black level stabilization data control circuit 14a and a comparison circuit 8. The automatic black level stabilization data control circuit 14a includes an A/D converter 15, a reference voltage control circuit 16a and a D/A converter 17. When the automatic black level stabilization function is switched to OFF, voltage data 13 divided by resistors R1 and R2 is A/D converted at A/D converter 15 and is supplied to reference voltage control circuit 16a. Reference voltage control circuit 16a supplies the voltage data to D/A converter 17 so that the output voltage of D/A converter 17 becomes equal to divided voltage 13 and the output voltage of D/A converter 17 is supplied to comparison circuit 8.

Switcher 10 is then set to the lower position and is connected to the output of comparison circuit 8. Divided voltage 13 is compared with a comparison voltage supplied from D/A converter 17 at comparison circuit 8. When the divided voltage 13 is lower than the comparison voltage, the output of comparison circuit 8 becomes positive and is supplied to grid voltage generating circuit 12 through switcher 10 and, as a result, the grid voltage increases. When the divided voltage 13 is higher than the comparison voltage, the output of comparison circuit 8 becomes negative and is similarly supplied to grid voltage generating circuit 12 through switcher 10 and, as a result, the grid voltage is reduced. Thus, the negative feedback loop converges so that the divided voltage 13 becomes equal to the comparison voltage. Because the comparison voltage is equal to the divided grid voltage during the ON state of the automatic black level stabilization function, the divided grid voltage 13 at an OFF state of the automatic black level stabilization function converges to the value at the ON state of the automatic black level stabilization function and the black level of the displayed picture is kept constant.

Figure 2:
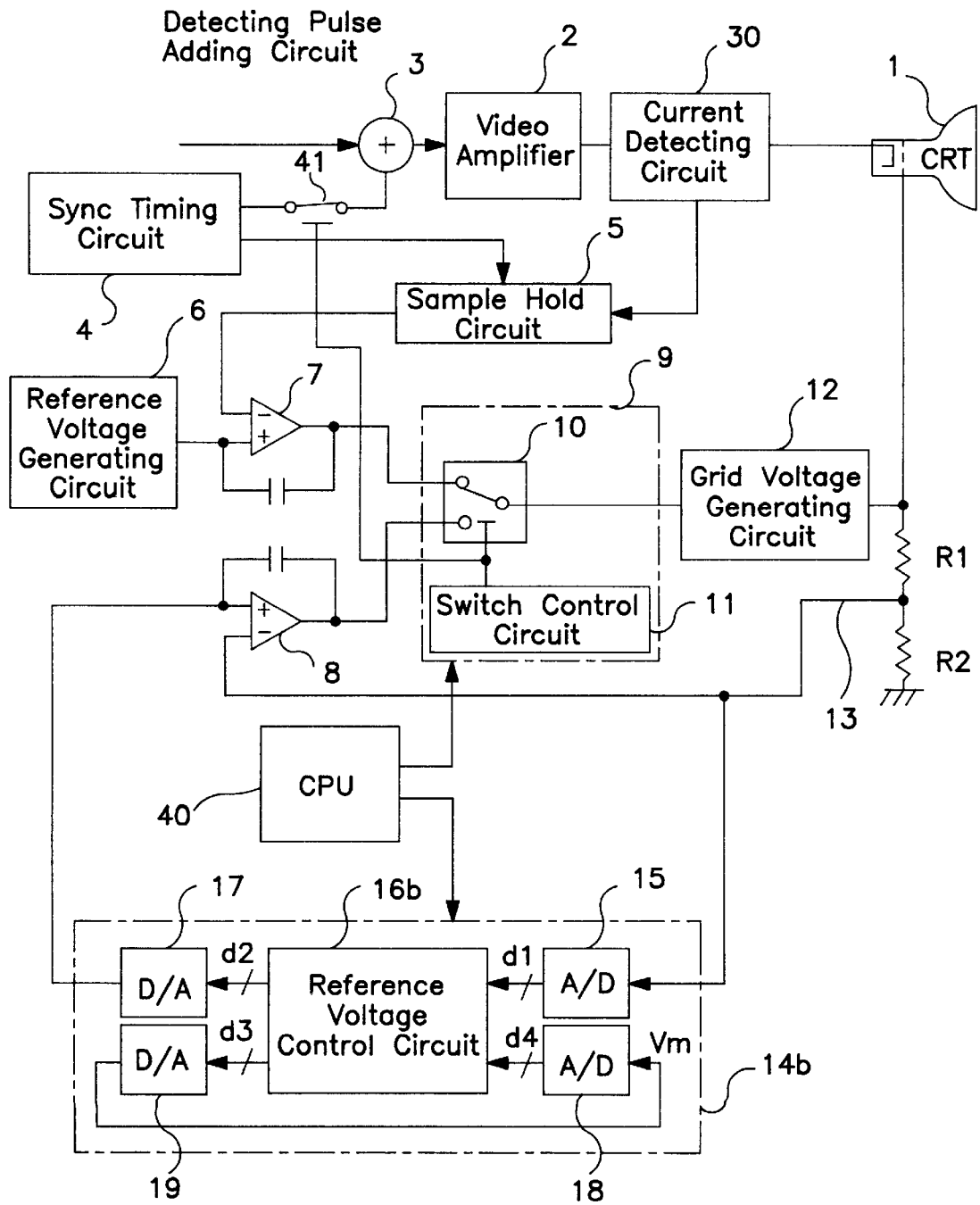
FIG. 2 is a block diagram of an automatic black level stabilizing apparatus in accordance with a second exemplary embodiment of the present invention.

Thus, the variation of the black level over time due to factors such as environmental temperature variation and self heat dissipation of the circuit elements can be eliminated by composing a negative feedback circuit which functions even when the automatic black level stabilization function is OFF similar to when the automatic black level stabilization function is ON. Second Exemplary Embodiment An automatic black level stabilizing apparatus in accordance with a second exemplary embodiment of the present invention is explained below, referring to FIG. 2. In FIG. 2, in addition to the circuit configuration shown in FIG. 1, an A/D converter 18 and a D/A converter 19 are included in automatic black level stabilization data control circuit 14b. A/D converter 18 and D/A converter 19 form a closed loop together with reference voltage control circuit 16b.

Figure 9A:
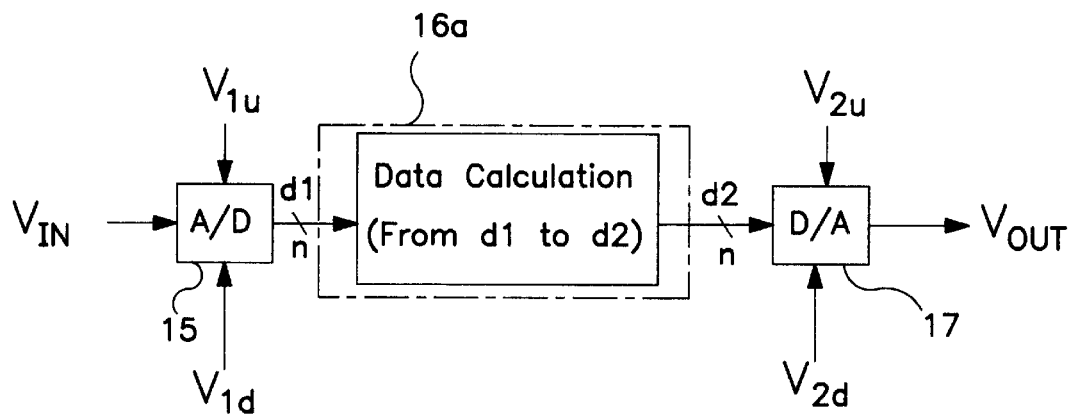
FIG. 9(a) is a block diagram of an automatic black level stabilization data control circuit of an automatic black level stabilizing apparatus in accordance with the first exemplary embodiment of the present invention.
Figure 9B:
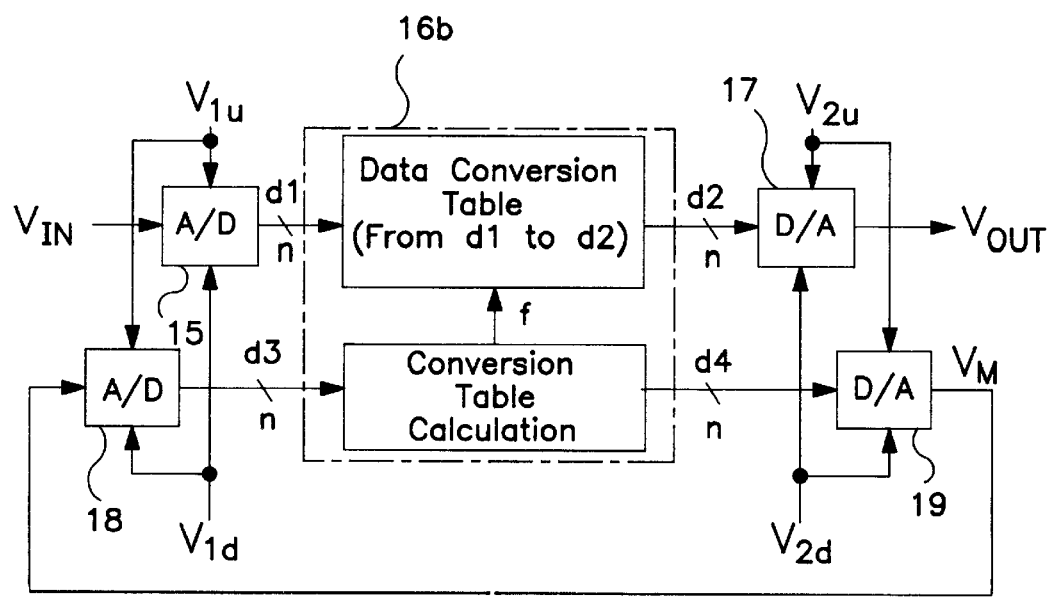
FIG. 9(b) is a block diagram of an automatic black level stabilization data control circuit of an automatic black level stabilizing apparatus in accordance with the second exemplary embodiment of the present invention.

The circuit shown in FIG. 2 is explained below, comparing with that shown in FIG. 1. Because the performance of portions of the circuit are similar to that of the first exemplary embodiment, a description of the similar portions is omitted and only the performance of automatic black level stabilization data control circuits 14a and 14b is explained. FIGS. 9(a) and 9(b) are block diagrams of an automatic black level stabilization data control circuits 14a and 14b of automatic black level stabilizing apparatus shown in FIGS. 1 and 2, respectively. In FIG. 9(a), automatic black level stabilization data control circuit 14a includes an A/D converter 15, a reference voltage control circuit 16a and a D/A converter 17. Divided grid voltage 13 supplied to A/D converter 15 is denoted by Vin, reference voltages for A/D conversion are denoted by V1u and V1d, the output data of A/D converter 15 is denoted by d1, the input data to D/A converter 17 is denoted by d2, reference voltages for D/A conversion are denoted by V2u and V2d, the output data of D/A converter 17 is denoted by Vout and resolution factors of A/D conversion and D/A conversion are denoted by n. In FIG. 9(b), the input data of D/A converter 19 is denoted by d4, the output voltage of D/A converter 19, which is also the input voltage of A/D converter 18, is denoted by Vm and the output data of A/D converter 18 is denoted by d3.

In FIG. 9(a), the following relations exist at A/D converter 15, $$Vin = V1d + d1*(V1u - V1d)/(2n-1) \quad \text{eq. 1}$$

$$Vout = V2d + d2*(V2u - V2d)/(2n-1) \quad \text{eq. 2}$$

Because reference voltage control circuit 16 works so that Vin=Vout, $$d2 = d1*(V1u - V1d)/(V2u - V2d) + (2n-1)*(V1d - V2d)/(V2u - V2u) \quad \text{eq. 3}$$

Input data d2 of D/A converter 17 is calculated like eq. 3 and processing is performed so that the black level, when the automatic black level stabilization function is OFF, is equal to that when the automatic black level stabilization function is ON. However, in an actual circuit, error occurs in the reference voltage at A/D conversion and D/A conversion due to error in the supply voltage. For example, when the reference voltage at A/D conversion has an error and the A/D converted data deviates by dl, the output voltage Vout of D/A converter 17 deviates by $$\Delta Vout = \Delta d1*(V1u - V1d)/(2n-1) \quad \text{eq. 4}$$

A difference occurs in the black level between when the automatic black level stabilization function is ON and when the automatic black level stabilization function is OFF.

The above problem is solved by a configuration shown in FIG. 9(b). The reference voltages of A/D converters 15 and 18 are used in common and the reference voltages of D/A converters 17 and 19 are used in common. D/A converter 19 converts input data d4 into analog signal Vm. Signal Vm is input to A/D converter 18 and is converted into data signal d3 and returns to reference voltage control circuit 16b. Such sending out of d4 is repeated over all data values from the minimum to the maximum and they are stored. Data dl converted from input signal Vin is converted into data d2 according to a conversion function between d3 and d4, using means such as a look-up-table and data d2 is converted into an analog voltage Vout and is output.

Thus, voltage Vm is converted into digital data d3 and d4 by A/D converter 18 and D/A converter 19 having an error in their reference voltages and calculation error of the control voltages between ON and OFF of the automatic black level stabilization function can be prevented by calculating using a conversion function between data d3 and d4.

Third Exemplary Embodiment

An automatic black level stabilizing apparatus in accordance with a third exemplary embodiment of the present invention is explained below, referring to FIG. 3. In addition to the configuration shown in FIG. 1, automatic black level stabilization ON/OFF switching circuit 9 includes a reference voltage generating circuit 20 and a switcher 21.

Figure 10A:
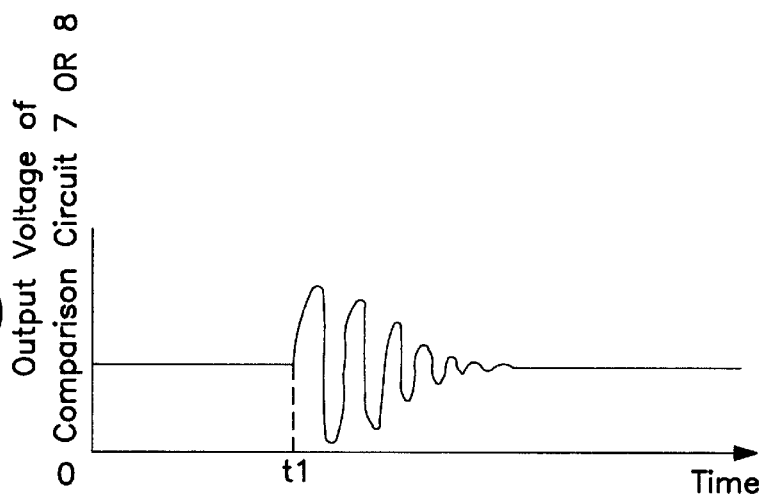
FIGS. 10(a)–(c) are graphs illustrating performance of ON/OFF switching in the third and fourth exemplary embodiments of the present invention.

In FIG. 1, when the ON state and the OFF state of the automatic black level stabilization function are switched by switcher 10, the negative feedback loops are switched and a negative feedback loop which was not working until then starts working and the black level is stabilized at a certain level. The output of comparison circuit 7 or 8 varies until stabilization as shown in FIG. 10(a). A problem occurs in that the grid voltage varies widely, an instantaneous excessive current flows in the cathode and the displayed picture flashes.

Figure 3:
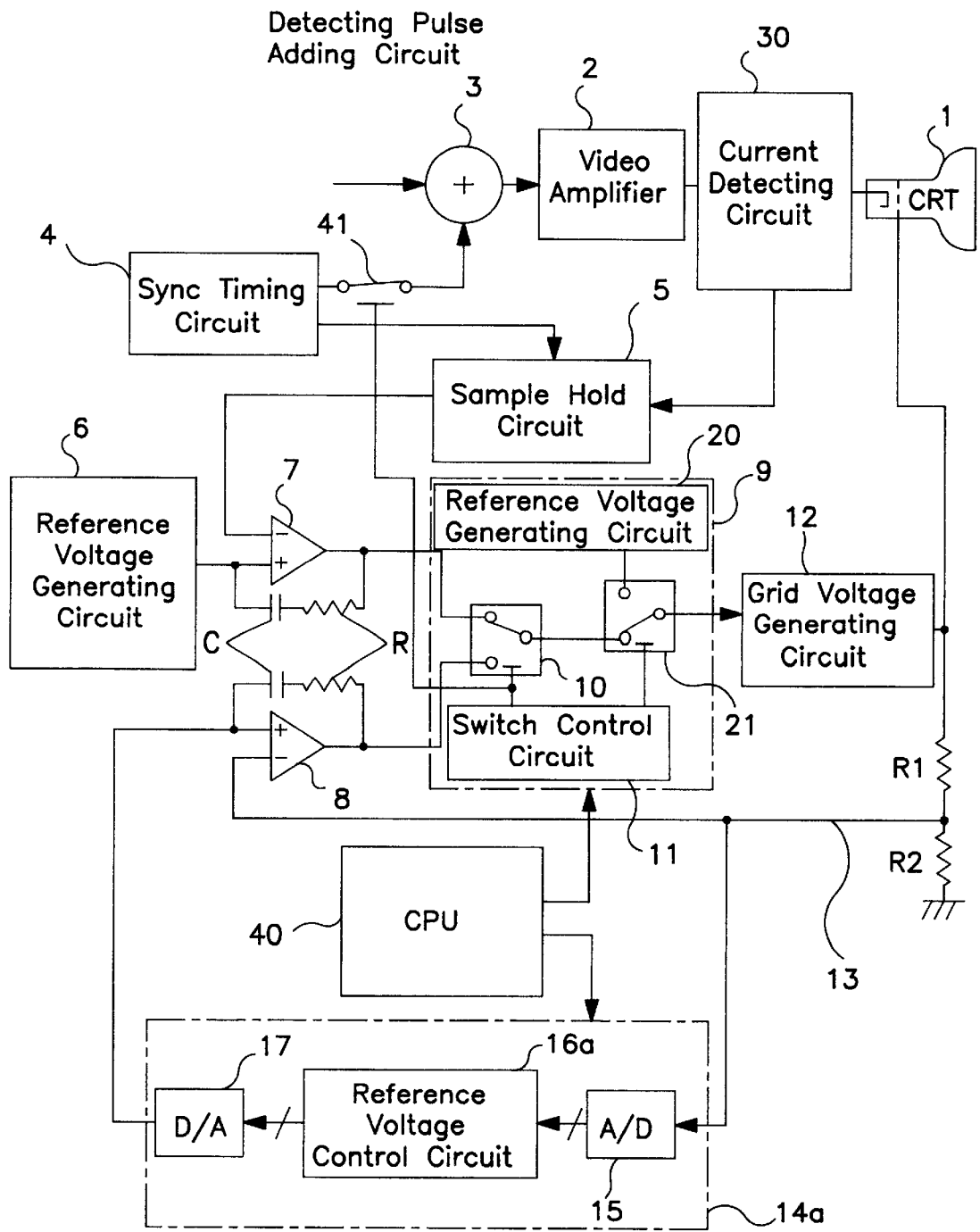
FIG. 3 is a block diagram of an automatic black level stabilizing apparatus in accordance with a third exemplary embodiment of the present invention.

In FIG. 3, however, when an OFF state of the automatic black level stabilization function is switched to an ON state, switcher 21 is set to the open position so that grid voltage generating circuit 12 is connected to reference voltage generating circuit 20. The output of reference voltage generating circuit 20 is set to a higher value than the control voltage of grid voltage generating circuit 12 at ON/OFF state of the automatic black level stabilization function and the grid voltage supplied from grid voltage generating circuit 12 is rises. Then, the cathode current increases and the voltage detected at sample hold circuit 5 is higher than the voltage detected when the ON state of the automatic black level stabilization function converges. Therefore, the voltage at the (−) terminal of comparison circuit 7 becomes higher than the (+) terminal voltage.

Figure 10B:
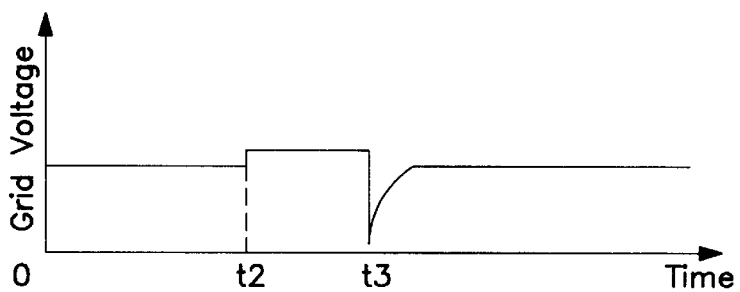

When switcher 10 is set to the upper position and switcher 21 is set to the down position, the grid voltage generating circuit 12 is connected to comparison circuit 7, and the output voltage of comparison circuit 7 decreases and works to lower the grid voltage supplied from grid voltage generating circuit 12. A series connection of a capacitor C and a resistor R is inserted between the (+) terminal and the output of comparison circuit 7. If a suitable value is selected for a converging time constant CR of comparison circuit 7, the grid voltage converges from a low voltage as shown in FIG. 10(b).

When the automatic black level stabilization function is switched from ON to OFF, divided grid voltage 13 is A/D converted at A/D converter 15, input to reference voltage control circuit 16 and stored there and is then D/A converted at D/A converter 17 and output. The (−) terminal voltage of comparison circuit 8 becomes higher than the (+) terminal voltage. The grid voltage can be converged similarly when the automatic black level stabilization function is in an ON state, as shown in FIG. 10(b).

As explained above, an excessive current flows in the cathode for an instant at ON/OFF switching of automatic black level stabilization function and the problem that the displayed picture flashes is solved.

Fourth Exemplary Embodiment

An automatic black level stabilizing apparatus in accordance with a fourth exemplary embodiment of the present invention is explained below, referring to FIG. 4. In addition to the configuration shown in FIG. 1, a D/A converter 24, data switches 27 and 28, an ON reference voltage generating circuit 25 and an ON/OFF switching data circuit 26 are further provided within an automatic black level stabilization data control circuit 14c and a problem at ON/OFF switching of the automatic black level stabilization is solved by a different configuration from the third exemplary embodiment.

Figure 4:
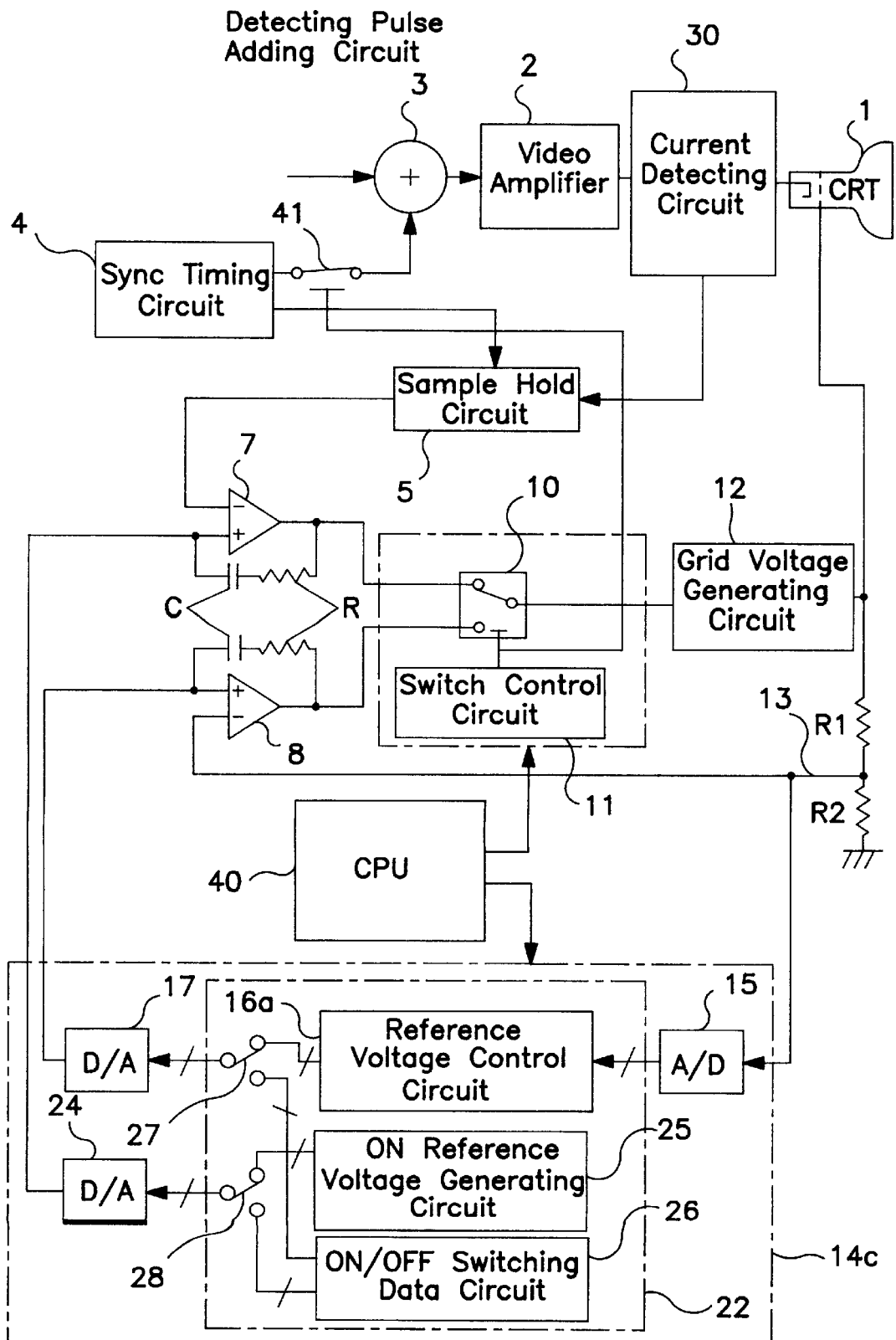
FIG. 4 is a block diagram of an automatic black level stabilizing apparatus in accordance with a fourth exemplary embodiment of the present invention.

In FIG. 4, when the black level stabilization function is switched from OFF to ON, first the signal supply to D/A converter 24 is changed from ON reference voltage generating circuit 25 to ON/OFF switching data circuit 26 by data switch 28. By always setting the data from ON/OFF switching data circuit 26 smaller than the output data of ON reference voltage generating circuit 25 when the black level stabilization convergence function is on, the voltage at the (+) terminal of comparison circuit 7 becomes lower than the (−) terminal voltage. Then when switcher 10 is set to the upper position, the output voltage of comparison circuit 7 decreases and it results in a decrease the grid voltage. If a series connection of capacitor C and resistor R is inserted between the (+) terminal and the output terminal of comparison circuit 7 and a converging time constant CR of comparison circuit 7 is suitably selected, the grid voltage converges from a lower voltage.

Figure 10C:
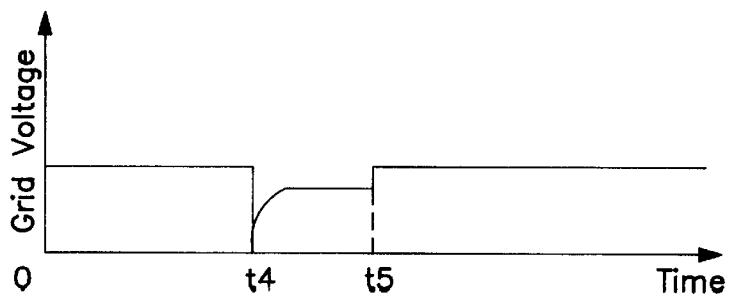

Then, data switch 28 is switched from the output of ON/OFF switching data circuit 26 to the output of ON reference voltage generating circuit 25 and the switching of the black level stabilization to an ON state is completed. The variation of the grid voltage over time is shown in FIG. 10(c).

In addition, when the black level stabilization is switched from an ON state to an OFF state, data switch 27 switches from the output of reference voltage control circuit 16a to the output of ON/OFF switching data circuit 26. By always setting the output data of ON/OFF switching data circuit 26 smaller than the output data of reference voltage control circuit 16a at convergence during the OFF state of the black level stabilization, the voltage at the (+) terminal of comparison circuit 8 becomes lower than the (−) terminal voltage. Then, switcher 10 is switched set to the lower position, the grid voltage converges, data switch 27 is switched from the output of ON/OFF switching data circuit 26 to the output of reference voltage control circuit 16a and the switching of the black level stabilization to the OFF state is completed. The variation of the grid voltage over time is also shown in FIG. 10(c).

As explained above, the problem that an excessive instantaneous cathode current flows and a displayed picture instantaneously flashes during the ON/OFF switching of the black level stabilization is prevented.

Fifth Exemplary Embodiment

Figure 5:
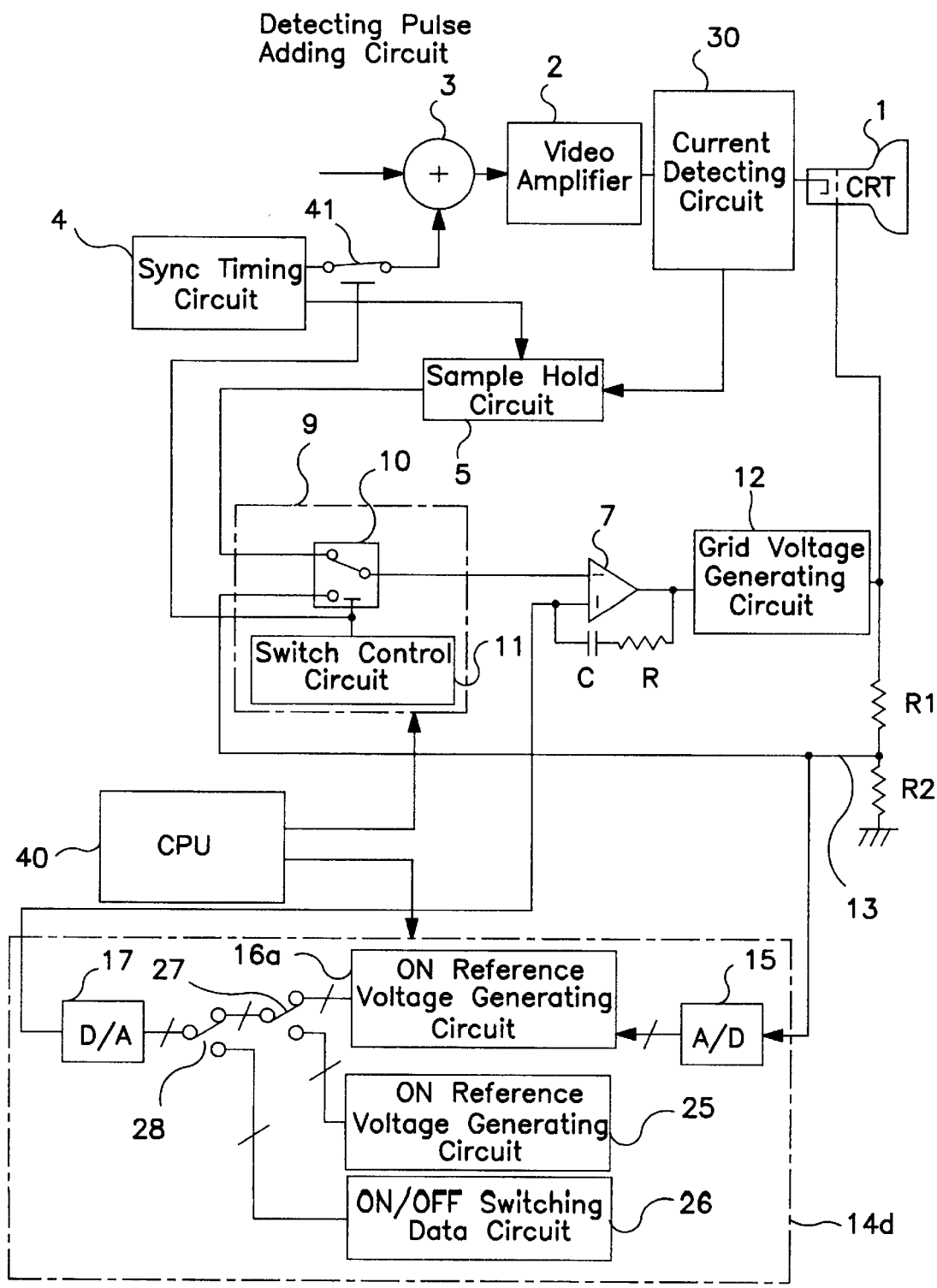
FIG. 5 is a block diagram of an automatic black level stabilizing apparatus in accordance with a fifth exemplary embodiment of the present invention.

An automatic black level stabilizing apparatus in accordance with a fifth exemplary embodiment of the present invention is explained below, referring to FIG. 5. It includes CRT 1, video amplifier 2, detecting pulse adding circuit 3, sync timing circuit 4, sample hold circuit 5, current detecting circuit 30, comparison circuit 7, automatic black level stabilization ON/OFF switching circuit 9, grid voltage generating circuit 12, automatic black level stabilization data control circuit 14d and so on. The main differences from the previous exemplary embodiments are that it does not have comparison circuit 8 and comparison circuit 7 executes convergence of ON and OFF states for automatic black level stabilization.

When the automatic black level stabilization function is switched from an OFF state to an ON state, first data switch 28 is switched to connect to ON/OFF switching data circuit 26. By always setting the output of ON/OFF switching data circuit 26 smaller than the output data of ON reference voltage generating circuit 25, the voltage at the (+) terminal of comparison circuit 7 becomes lower than the (−) terminal voltage. Then, when switcher 10 is switched to the upper position, the output voltage of comparison circuit 7 decreases and results in a decrease of grid voltage. If a suitable value is adopted for a converging time constant CR of comparison circuit 7, the grid voltage converges from a low voltage. Then, the output is changed from ON/OFF switching data circuit 26 to ON reference voltage generating circuit 25 by both data switches 27 and 28, and the switching of the automatic black level stabilization to an ON state is completed. The variation of the grid voltage over time is shown in FIG. 10(c).

In addition, when the black level stabilization is switched from an ON state to an OFF state, data switch 28 switches to connect to the output of ON/OFF switching data circuit 26. By always setting the output data of ON/OFF switching data circuit 26 smaller than the output data of reference voltage control circuit 16a at convergence during the OFF state of the black level stabilization, the voltage at the (+) terminal of comparison circuit 7 becomes lower than the (−) terminal voltage. Then, switcher 10 is switched to the lower position, the grid voltage converges, data switches 27 and 28 are switched from the output of ON/OFF switching data circuit 26 to the output of reference voltage control circuit 16a and the switching of the black level stabilization to an OFF state is completed. The variation of the grid voltage over time is also shown in FIG. 10(c).

Figure 11:
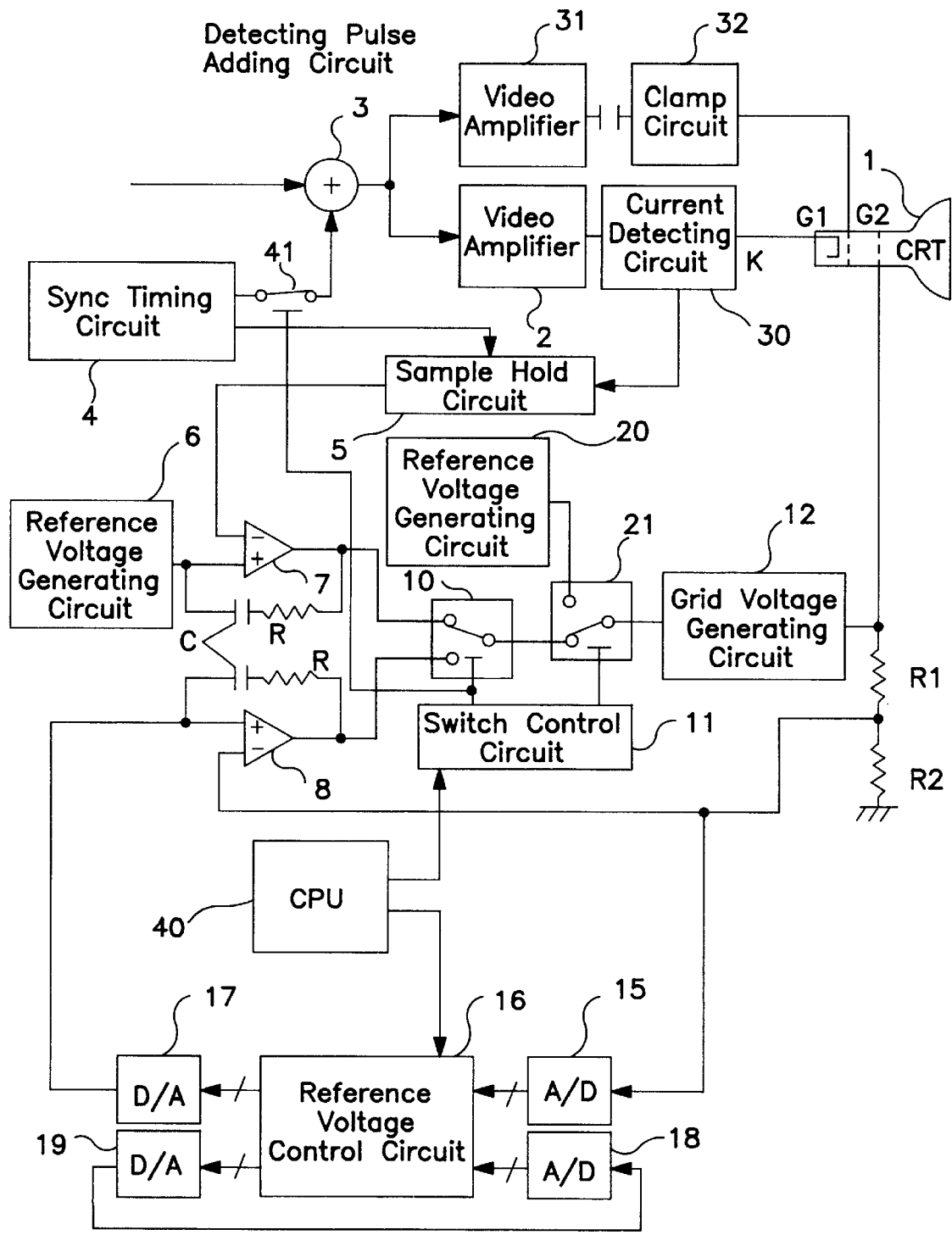
FIG. 11 is a block diagram of an automatic black level stabilizing apparatus applied to both a cathode and a grid drive system which includes various aspects of the first, second and third exemplary embodiments of the present invention.

A block diagram of an automatic black level stabilizing apparatus applied for a both cathode and G 1 drive system in accordance with a combination of the first, second and third exemplary embodiments of the present invention is shown in FIG. 11. In FIG. 11, video amplifiers 2 and 31 are provided at previous stages of the cathode K and the first grid G1. A video signal is supplied to both cathode K and grid G1 and black level stabilization is done by controlling the voltage of the second grid G2 according to the present invention.

As described above in detail, according to the present invention, an automatic black level stabilizing apparatus having the following effects can be presented.

(1) When an automatic black level stabilization function is OFF, a problem of black level variation over time can be solved.

(2) When an automatic black level stabilization function is switched from an ON state to an OFF state, black level error which occurs due to errors at A/D conversion and D/A conversion stages of an OFF control circuit can be decreased.

(3) When an automatic black level stabilization function is switched from OFF to ON and from ON to OFF, a problem of a displayed picture due to non-stabilization of the black level until the negative feedback loop converges can be prevented.

A signal is processed so that the black level of a displayed picture becomes constant by obtaining above-described effects and a clearer picture can be presented.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An automatic black level stabilizing apparatus for use with a display for displaying a video signal, the apparatus comprising:

adding means for adding a detecting pulse to the video signal;

first detecting means for detecting a current level in the display during a period of said detecting pulse;

first control means for controlling a black level of said display by comparing an output level of first detecting means to a reference level;

second detecting means for detecting a grid voltage of said display;

memory means for storing a first output level of said second ii detecting means during an operational period of said first control means; and second control means for controlling the black level of said display by comparing the first output level of said second detecting means stored in said memory means with a second output level of said second detecting means during a non-operational period of said first control means.

2. A method of automatic black level stabilization for use with a display displaying a video signal, the method comprising the steps of:

(a) adding a detecting pulse during a blanking period of said video signal;

(b) detecting a black level of said video signal during a period of the detecting pulse;

(c) controlling a brightness of the display by comparing said black level of said video signal with a reference level;

(d) measuring a level of a grid voltage of said display during the controlling step (c);

(e) storing said detected grid voltage level;

(f) measuring a further level of said grid voltage at a later time;

(g) comparing said measured grid voltage level of step (f) with the level of said stored grid voltage level of step (e) to obtain a comparison result; and (h) controlling the brightness of the display in accordance with said comparison result.

3. An automatic black level stabilizing apparatus for use with a video signal displayed on a display, comprising:

first stabilizing means for stabilizing a black level of the displayed video signal by i) adding a detecting pulse during a blanking period of a video signal, ii) detecting a voltage corresponding to a cathode current during a period of said detecting pulse, iii) comparing the detected voltage with a reference voltage and producing a comparison result, iv) controlling a grid voltage according to the comparison result, and v) controlling a negative feedback loop so as to keep the cathode current constant during said detecting pulse period; and second stabilizing means for stabilizing the black level by i) dividing the grid voltage while said first stabilizing means is stabilizing said black level, ii) A/D converting the divided grid voltage into digital data, iii) storing the digital data of said divided grid voltage, iv) converting the digital data so that the stored digital data is equal to said divided grid voltage before the A/D conversion, v) D/A converting the converted digital data into an analog voltage, vi) comparing the converted analog voltage with the divided grid voltage and, vii) controlling a negative feedback loop so that the grid voltage converges to the D/A converted analog voltage, wherein the black level is stabilized by selectively actuating said first and second stabilizing means and controlling the negative feedback loops.

4. An automatic black level stabilizing apparatus as recited in claim 3, wherein a method to calculate so that the stored digital data is equal to the divided grid voltage before the A/D conversion is that i) the digital data is D/A converted, ii) the converted analog voltage is A/D converted into digital data and stored, iii) a conversion function of the A/D converted digital data corresponding to said digital data is obtained, iv) the stored digital data is converted using said conversion function for obtaining A/D converted data of said divided grid voltage, and v) the converted data is D/A converted.

5. An automatic black level stabilizing apparatus as recited in claim 3, wherein when switching between said first stabilizing means and said second stabilizing means, i) the grid voltage is switched to a reference voltage which is higher than the grid voltage; and ii) said second stabilizing means is selected to suppress a varying grid voltage during switching and stabilize the black level of a displayed picture.

6. An automatic black level stabilizing apparatus as recited in claim 3, wherein when switching between said first stabilizing means and said second stabilizing means, i) the comparison voltage of comparison means in said first stabilizing means is switched to a lower fixed voltage than the grid voltage during stabilization; and ii) the second stabilizing means is selected, setting the comparison voltage back to the original value and stabilizing the grid voltage, to suppress a varying grid voltage during switching and stabilize the black level of a displayed picture.

7. An automatic black level stabilizing apparatus for use with a video signal and a display, said apparatus comprising:

cathode current stabilizing means including:

i) detecting pulse adding means for adding a detecting pulse during a blanking period of the video signal;

ii) current detecting means for detecting a voltage corresponding to a cathode current during the blanking period;

iii) first comparison means for (a) comparing said detected voltage during said blanking period with a reference voltage and (b) outputting a first voltage corresponding to a difference voltage between said detected voltage and said reference voltage; and iv) grid voltage generating means for generating a grid voltage responsive to the first voltage of said first comparison means;

grid voltage stabilizing means including:

i) voltage dividing means for dividing the grid voltage during operation of said cathode current stabilizing means;

ii) A/D converting means for converting said divided grid voltage into digital data;

iii) memory means for storing said digital data;

iv) data conversion means for converting said stored digital data to a value equal to said divided grid voltage;

v) D/A converting means for converting an output of said data conversion means into an analog signal;

vi) second comparison means for comparing said analog signal from said D/A converting means with said divided grid voltage and outputting a second voltage corresponding to a difference between said analog signal and said divided grid voltage; and vii) said grid voltage generating means for generating the grid voltage according to the second voltage of said second comparison means; and switching means for selecting one of said cathode current stabilizing means and said grid voltage stabilizing means;

wherein said grid voltage generating means is selected by said switching means whether said grid voltage generating means is part of said cathode current stabilizing means or said grid voltage stabilizing means.

8. An automatic black level stabilizing apparatus as recited in claim 7, wherein said data conversion means comprises:
D/A converting means for converting said digital data;
A/D converting means for converting said converted analog data into a digital data signal;
memory means for storing the converted digital data signal output from said A/D converting means; and
data conversion means for converting the digital data A/D converted from the divided grid voltage, using a conversion function of an A/D converted data for said digital data as a data conversion table.

9. An automatic black level stabilizing apparatus as recited in claim 7, wherein said switching means selects the grid voltage to be a reference voltage which is higher than the grid voltage and
(i) switching the grid voltage to a higher fixed voltage than the grid voltage during operation of said cathode current stabilizing means; and
(ii) selecting said grid voltage stabilizing means to suppress a varying grid voltage occurring during switching and stabilize the black level of the display.

10. An automatic black level stabilizing apparatus as recited in claim 7, wherein said switching means for selects a comparison voltage of one of said first comparison means and said second comparison means of said cathode current stabilizing means and said grid voltage stabilizing means, respectively, to a lower voltage than that at stabilization, and the comparison voltage of said one of said first and second comparison means is switched to a lower fixed voltage than the comparison voltage during stabilization, then after being switched to the other stabilizing means,
i) the comparison voltage is set back to an original value,
ii) the grid voltage is stabilized,
iii) a varying grid voltage at switching is suppressed and
iv) the black level of a displayed picture is stabilized.

11. A method of automatic black level stabilization for use with a display and a video signal comprising the steps of:

(a) adding a detecting pulse during a blanking period of the video signal;

(b) detecting a cathode current of a cathode ray tube displaying said video signal, during a period of the detecting pulse;

(c) controlling a brightness of said display by comparing the level of said detected cathode current during the detecting pulse period with a reference voltage;

(d) storing the cathode current level detected in step (b) as a first level;

(e) setting a second level larger than said first level;

(f) controlling the brightness of said cathode ray tube by comparing said second level with a grid voltage of said cathode ray tube; and (g) controlling the brightness of said cathode ray tube by comparing said first level with the grid voltage of said cathode ray tube.

12. An automatic black level stabilizing apparatus for use with a video signal, said apparatus comprising:

cathode current stabilizing means for stabilizing a black level of a displayed picture using a first negative feedback control to keep a cathode current constant by
i) adding a detecting pulse during a blanking period of the video signal,
ii) detecting a voltage corresponding to the cathode current during a period of the detecting pulse,
iii) comparing said detected voltage with a reference voltage, and
iv) controlling the grid voltage according to the comparison result, and grid voltage stabilizing means for stabilizing the black level of the displayed picture using a negative feedback control in which the grid voltage converges into a D/A converted voltage by
i) dividing the grid voltage during operation of said cathode current stabilizing means,
ii) storing digital data obtained by A/D conversion of the divided grid voltage,
iii) converting the digital data so that the stored digital data after D/A conversion becomes equal to a divided grid voltage before A/D conversion,
iv) D/A converting the converted digital data into an analog voltage, and
v) comparing the last D/A converted analog voltage with the divided grid voltage by switching comparison input signals from comparison means, wherein the black level of a displayed picture is stabilized using one of said cathode current stabilizing means and said grid voltage stabilizing means.

13. An automatic black level stabilizing apparatus for use with a video signal, said apparatus comprising:

adding means for adding a detecting pulse during a blanking period of the video signal, said detecting pulse having a period;

current detecting means for detecting a voltage corresponding to a cathode current during said detecting pulse period;

comparison means for comparing the detected voltage from said current detecting means with a reference voltage and outputting a voltage proportional to a difference between said detected voltage and said reference voltage;

grid voltage generating means for generating a grid voltage proportional to the output voltage of said comparison means;

dividing means for dividing the grid voltage;

A/D converting means for converting said divided grid voltage into digital data;

storing means for storing said digital data;

data calculation means for converting the stored digital data to be equal to said divided grid voltage;

D/A converting means for converting an output of the data calculation means into an analog signal;

comparison reference voltage output means, for providing said reference voltage, coupled to said comparison means; and comparison input signal switching means coupled to said comparison means; and wherein the black level of a displayed picture is stabilized by one of said cathode current stabilization and grid voltage stabilization by selecting comparison input signals from said comparison means.

14. An automatic black level stabilizing apparatus as recited in claim 1, wherein the detected pulse is added to the video signal during a blanking period of the video signal.

15. An automatic black level stabilizing apparatus as recited in claim 1, wherein the current level is detected during a period of the detecting pulse.

16. An automatic black level stabilizing apparatus as recited in claim 1, wherein the black level of the display is controlled during a period of the detecting pulse.

17. An automatic black level stabilizing apparatus as recited in claim 13, further comprising:

said comparison reference voltage output means having
(a) an on/off switching data means for providing a first reference voltage, and
(b) an on-reference voltage generation means for providing a second reference voltage higher than said first reference voltage, a data switching means for switching between said first reference voltage and said second reference voltage and providing an output, said comparison means compares the detected voltage from said current detecting means with said output of said switching means, and said comparison input signal switching means switches between said divided grid voltage and said detected voltage from said current detecting means.

* * * * *